United States Patent [19]

Birjukov et al.

[11] 4,266,922

[45] May 12, 1981

[54] MOLD FOR MANUFACTURING ABRASIVE SEGMENTS

[76] Inventors: Mikhail N. Birjukov, prospekt Lenina, 35/20, kv. 91; Gennady N. Maslov, ulitsa Pervomaiskaya, 34/19, kv. 25, both of Elektrostal Moskovskoi oblasti; Vladimir P. Smorodinnikov, ulitsa Pobedy, 10, kv. 6, V. Dubrovo Sverdlovskoi oblasti; Anatoly P. Kulikov, ulitsa Vostochnaya, 5, V. Dubrovo Sverdlovskoi oblasti; Ida G. Udilova, ulitsa Pobedy, 10, kv. 2, V. Dubrovo Sverdlovskoi oblasti; Vladimir K. Zuev, ulitsa Sovetskaya, 11/2, kv. 55, Elektrostal Moskovskoi oblasti; Anatoly A. Lukyanov, ulitsa Rogozhskaya, 100b, Noginsk Moskovskoi oblasti; Konstantin S. Tolstopyatov, ulitsa Pervomaiskaya, 30, kv. 24, Elektrostal Moskovskoi oblasti; Alexandr E. Kalinichev, 1 Kommunalny proezd, 15/13, Elektrostal Moskovskoi oblasti; Ivan Y. Zhabin, ulitsa 8 Marta, 58/a, kv. 6, Elektrostal Moskovskoi oblasti, all of U.S.S.R.

[21] Appl. No.: 135,323

[22] Filed: Mar. 31, 1980

[51] Int. Cl.³ .......................... B28B 7/00; B29C 1/00; B29C 1/16

[52] U.S. Cl. .................................... 425/182; 249/139; 249/161; 249/163; 249/164; 249/167; 249/219 R; 425/186; 425/195; 425/406

[58] Field of Search .............. 249/160, 163, 165, 139, 249/164, 219, 161, 167; 425/182, 412, 441, 451.9, 454, 457, 193, 195, 186, 352, 406; 164/284, 292, 295, 339, 364

[56] References Cited

U.S. PATENT DOCUMENTS

| | | | |
|---|---|---|---|
| 779,775 | 1/1905 | Evenstad | 249/161 |
| 1,417,246 | 5/1922 | Hazeltine | 249/160 |
| 1,787,177 | 12/1930 | Steppe et al. | 249/160 |
| 2,116,483 | 5/1938 | Williams et al. | 249/160 |
| 3,945,428 | 3/1976 | Yanagisawa et al. | 249/160 |

*Primary Examiner*—W. E. Hoag

*Attorney, Agent, or Firm*—Robert E. Burns; Emmanuel J. Lobato; Bruce L. Adams

[57] ABSTRACT

A mold comprises a base, a split die and a plunger. The base has longitudinal shoulders with resilient elements, and sloping surfaces which form an upwardly flaring nest adapted to accommodate a vertically movable die. The side walls of the die have their sloping surfaces in contact with the sloping surfaces of the longitudinal shoulders and, together with the die end walls, are placed around the die bottom. Provided between the base and the die are means for lifting the latter and means for supporting the die bottom in the raised position after the die has been lowered. Such die construction makes it possible to reduce the time required for its assembly and disassembly, as well as for detaching the finished abrasive segment from the die walls.

4 Claims, 9 Drawing Figures

MOLD FOR MANUFACTURING ABRASIVE SEGMENTS

FIELD OF THE INVENTION

The present invention relates to the pressing of powders and more in particular to molds for use in the manufacture of abrasive segments by a hot pressing method.

DESCRIPTION OF THE PRIOR ART

It is common practice to manufacture abrasive segments by means of a mould which generally comprises a split die mounted on a base and fixed in the upright position with the aid of plates interconnected by means of coupling elements. The split die is made up of a bottom, two side walls and two end walls resting on the bottom, the latter being formed so as to conform in shape to the configuration of the segment being produced.

However, the mold described above is unsuitable for use in the manufacture of abrasive segments by reason of being complicated to assemble and disassemble, since constant tightening and loosening of coupling elements requires much time and additional equipment. In addition, as the segment being manufactured tends to stick to the die in the process of hot pressing, it should be separated from the die component parts, which is both labor- and time-consuming operation, resulting in substantially lower production efficiency.

There is known at present a great variety of mold constructions. For example, the bar mold variety widely used now for the manufacture of concrete articles (cf. U.S.S.R. Inventor's Certificate No. 292,786) comprises a bottom with articulated side walls and detachable vertical partitions held in the upright position with the aid of a collar.

There is also known a mold for manufacturing concrete articles, which comprises end walls and longitudinal walls secured on a bottom made up of two parts and interconnected either by means of a sliding joint (cf. U.S.S.R. Inventor's Certificate No. 224,355), or with the aid of an elastic plate (cf. U.S.S.R. Inventor's Certificate No. 315,614) having attached thereto an intermediate side wall.

The above-mentioned molds are unsuitable for use in the manufacture of abrasive segments, as constructionally they are unadaptable to pressing operations. In other words, these types of molds are unable to withstand both considerable forces acting thereon during pressing and elevated temperatures.

SUMMARY OF THE INVENTION

It is the primary object of the invention to enhance efficiency of the pressing process by reducing the time required for assembly and disassembly of a mold.

Another object of the invention is to simplify the operation of removing a finished segment from a mold.

These and other objects and features of the invention are accomplished by the provision of a mold for use in the manufacture of abrasive segments, comprising a base, a split die having a bottom, side walls and end walls fixed in the upright position, and a plunger, wherein, according to the invention, the base the longitudinal shoulders with resilient elements and sloping surfaces forming an upwardly flaring nest adapted to accomodate a vertically movable die having the sloping surfaces of its side walls in contact with the sloping surfaces of the base, the side and end walls of the die being placed around its bottom, with a die lifting means and means for supporting the die bottom in the raised position, after lowering the die being arranged between the base and the die.

The fact that the longitudinal shoulders of the base and the side walls of the die are formed with sloping surfaces permits the die to be fixedly mounted in the nest without employing auxiliary equipment and thereby ensuring enhanced production efficiency. In addition, the resilient members provided on the base shoulders serve to hold the die in fixed position when the material to be pressed is fed into the die.

Placing the die lifting means between the base and the die would enable the die to be automatically raised after the pressing force has been relieved, whereby favourable conditions are prepared for subsequent opening of the die and withdrawal of the finished segment therefrom.

With the means for supporting the die bottom in the raised position being located between the base and the die, the finished segment is presse out from the die without any additional equipment or extra time, which, in turn, makes for enhanced production efficiency due to substantial saving in time required for the die disassembly and removal of the finished segment.

Placing the side and end walls of the die around its bottom would enable abrasive segment to be detached from the side and end walls of the die in the process of its lowering, the latter operation being performed with the aid of the same press used for forming the abrasive segment.

The side walls of the die are preferably made L-shaped in form and are arranged so as to have their projections presented to the bottom in a manner to form its periphery. Such shape of the die side walls permits the finished segment to be detached not only from the side walls but from the peripheral part of the bottom, which, in turn, facilitates subsequent separation of the segment from the bottom.

According to the invention, the die lifting means is made in the form of two resilient members, and the die supporting means is provided in the form of a supporting plate which is positioned underneath the bottom of the die after it has been raised; the side walls of the die being formed with slots intended for the supporting plate to extend therethrough. From the above it follows that with the mold of the invention it becomes feasible to materially reduce the time required for the assembly and disassembly of a die, as well as for the separation of the finished abrasive segment from the bottom of the die and from its side and end walls, which, in turn, enhances production efficiency. Furthermore, with such mold construction it becomes possible to develop an apparatus capable of manufacturing several abrasive segments at a time.

BRIEF DESCRIPTION OF THE DRAWINGS

The invention will now be described, by way of example only, with reference to the accompanying drawings, wherein.

DETAILED DESCRIPTION OF THE PREFERRED EMBODIMENT

Figure 1:
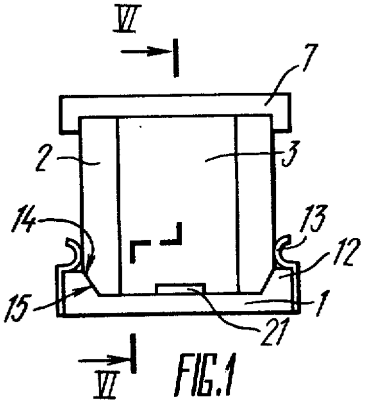
FIG. 1 is a general view of a mold assembly.

The mold, illustrated, for use in the manufacture of abrasive segments comprises a base 1 (FIG. 1), a split die having side walls 2, end walls 3 and a bottom 4 (FIGS. 2,3), a plunger 5, pressure sleeves 6 and a cover 7.

The side walls 2 (FIGS. 2,3 and 4) and the end walls 3 are placed around the bottom 4 to form a cavity 8 intended to receive a mass 9 (FIG. 3) to be pressed. Introduced into the same cavity 8 onto the mass 9 is the plunger 5 made in the form of a plate with the pressure sleeves 6 being fitted thereon.

Figure 5:
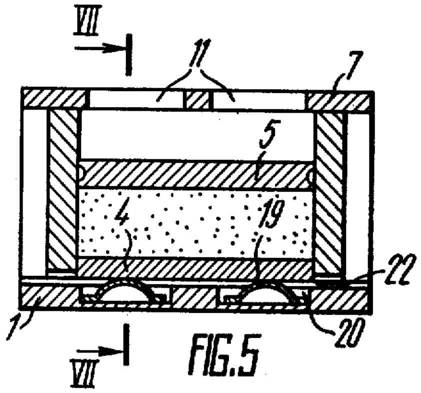
FIG. 5 shows a die in the raised position.

The cover 7 has shoulders 10 which envelop the die side walls 2, and holes II (FIG. 5) through which the pressure sleeves 6 are mounted on the plunger 5.

The die side walls 2 (FIG. 4) are formed with vertically extending slots adapted to receive the end walls 3. Such arrangement of the end walls 3 allows the side walls 2 and the end walls 3 to be fixed in the upright position by means of the cover 7.

The base 1 has longitudinal shoulders 12 with resilient members 13, and sloping surfaces 14 which form an upwardly flaring nest adapted to accomodate the vertically movable die. In turn, the side walls 2 of the die also have sloping surfaces 15 which are brought in contact with the sloping surfaces 14 of the base 1.

Figure 2:
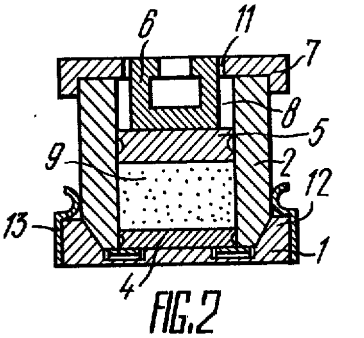
FIG. 2 is a longitudinal view of FIG. 1, with the bottom of a die being equal in width to the die cavity.
Figure 3:
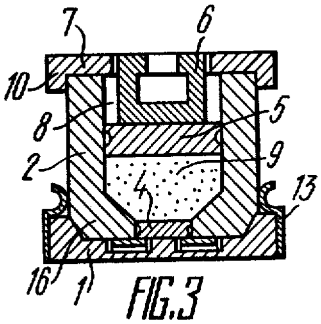
FIG. 3 is a longitudinal view of FIG. 1, with the bottom of a die being smaller in width than the die cavity.

The resilient members are made in the form of curved elastic plates, such as shown at 13 in FIGS. 1,2,3, which are fixed to the longitudinal shoulders 12 and whose bent portions are in touch with the side walls 2.

The bottom 4 of the die is made so as to conform in shape to the configuration of a segment and may extend throughout the width of the cavity 8, such as shown in FIG. 2.

Figure 4:
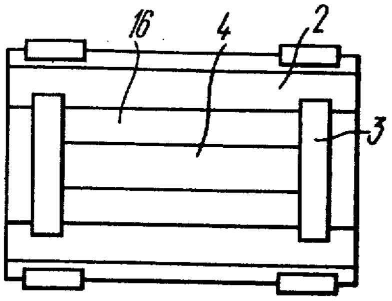
FIG. 4 is a top view of a die without a cover, plunger and pressure sleeves.

However, in order to facilitate subsequent separation of the segment being formed from the die, the bottom 4 can be made to have a substantially smaller width than the die cacity 8, such as shown in FIGS. 3,4, with the side walls 3 being made L-shaped in form and positioned so as to have their projections 16 presented to the bottom 4 and thus forming its periphery.

Located or arranged between the base 1 and the die is a die lifting means 17 (FIG. 6), and a means 18 (FIG. 7) for supporting the die bottom 4 in the raised position after the die has been lowered.

Figure 7:
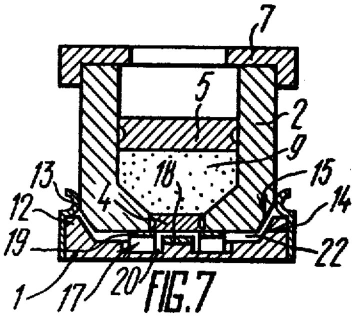
FIG. 7 is a cross-section VII—VII of FIG. 5.
Figure 6:
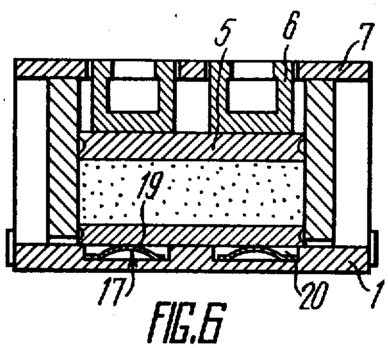
FIG. 6 is a cross-section VI—VI of FIG. 1.
Figure 8:
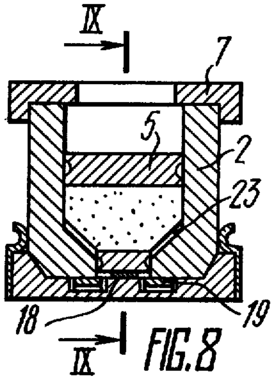
FIG. 8 shows the position of the die bottom together with a segment after the die has been lowered.

The die lifting means 17 is made in the form of resilient members, such as flat springs shown at 19 in FIGS. 6,7,8, fitted in slots 20 formed in the base. However, any other appliances or mechanisms suitable for lifting the die may be used as the means 17.

Figure 9:
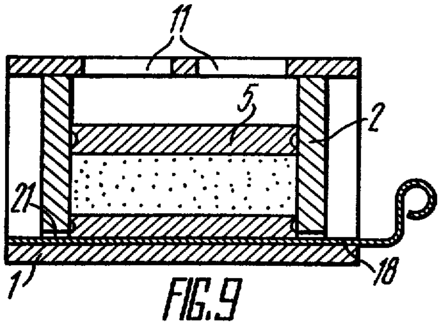
FIG. 9 is a cross-section IX—IX of FIG. 8.

The means 18 (FIGS. 7 and 9) for supporting the die bottom 4 in the raised position is provided in the form of a supporting plate which is placed underneath the bottom of the die after the latter has been raised. To facilitate the introduction of the supporting plate underneath the die bottom 4, the end walls 3 (FIG. 1) of the die are formed with slots 21 open on the side of the base 1, opposite the die bottom 4.

The mold of the invention operates in the following way.

First, the bottom of the die is placed on the base. Then, the end walls 3 (FIGS. 1, 2 and 3) are mounted in the vertical slots of the side walls 2, whereupon this wall assembly is accomodated in the nest of the base 1, so that the bottom 4 is embraced by the side walls 2 and the end walls 3. The sloping surfaces 14 and 15 permit the die to be accurately centered in the base nest, whereas the shoulders 12 with the resilient members 13 serve to support the die in the upright position.

Once the die is placed on the base 1, a mass to be pressed is fed into the die cavity 8 (FIGS. 3,6), the plunger 5 is positioned thereon, the cover 7 is fitted, and the pressure sleeves 6 are mounted on the plunger 5 through the holes II formed in the cover 7. Afterward, the mold is placed under any conventional press equipped with heated plates, and vertical load is applied to the pressure sleeves 6, thus initiating the process of pressing, which process proceeds simultaneously with bakelization of abrasive segment. As this happens, the flat springs 19 of the die lifting means 17 are compressed, the die, centered with the aid of the sloping surfaces 14 and 15, is seated in the nest of the base 1, and the cover 7 reliably holds the die walls in vertical position throughout the operating process. With the vertical load, relieved the flat springs 19 (FIG. 5) are actuated to lift the die together with the segment being formed. Next, the plate 18 is introduced into the gap 22 (FIG. 7) between the die and the base so as to support the die bottom in the raised position. The pressure sleeves 6 (FIGS. 8 and 9) are then removed and vertical load is again applied through the cover 7 onto the side walls 2 and the end walls 3 of the die. As a result, the die starts to move downwardly until the die bottom 4 is thrust up against the supporting plate. As the side walls 2 and the end walls 3 of the die continue their downward movement, they destruct the baked layer of the abrasive segment sticking to the surfaces of these walls. As this happens, gaps 23 are formed round the bottom periphery between the segment and the projections 16 of the side walls 2. After the vertically applied load stress has been relieved, the mold is withdrawn from under the press and then is disassembled. On removing the cover 7, the side walls 2 and the end walls 3 of the die, the finished segment, separated from the plunger and the die bottom 4, is then withdrawn. On completion of the operating cycle, the component parts of the die undergo cleaning and lubrication, the mold is reassembled, and the operating cycle is resumed.

What is claimed is:

1. A mold for manufacturing abrasive segments, comprising: a base; said base being formed with longitudinal shoulders; resilient members affixed on said longitudinal shoulders; sloping surfaces of said longitudinal shoulders forming an open, upwardly flaring nest; a split die accomodated in the nest of said base with the possibility for vertical movement and having a bottom, two end walls and two side walls; said end walls and side walls being placed around said bottom; the side walls of said die being arranged along said longitudinal shoulders and having sloping surfaces thereof in contact with the sloping surfaces of said longitudinal shoulders; means for fixing the side and end walls of said die in the upright position; means for lifting said die, said means being positioned between said base and said die; means for supporting the bottom of said die in the raised position after having lowered said die, said means being arranged between said base and said die after having raised said die; a plunger for transmitting the pressing force, said plunger being accomodated in said die.

2. A mold as claimed in claim 1, wherein the side walls of said die are L-shaped in form and are arranged so as to have their projections presented to the bottom in a manner to form its periphery.

3. A mold as claimed in claim 1, wherein said die lifting means is made in the form of resilient members.

4. A mold as claimed in claim 1, wherein said die bottom supporting means is made in the form of a supporting plate to be placed underneath the bottom of said die after the latter has been raised; slots formed in said end walls of the die opposite its bottom and intended for the supporting plate to extend therethrough.

* * * * *